US011947625B2

(12) United States Patent
Mummadi et al.

(10) Patent No.: US 11,947,625 B2
(45) Date of Patent: Apr. 2, 2024

(54) DATA-BASED UPDATING OF THE TRAINING OF CLASSIFIER NETWORKS (71) Applicant: Robert Bosch GmbH, Stuttgart (DE)

(72) Inventors: Chaithanya Kumar Mummadi, Heimsheim (DE); Jan Hendrik Metzen, Boeblingen (DE); Kilian Rambach, Stuttgart (DE); Robin Hutmacher, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 383 days.

(21) Appl. No.: 17/479,161

(22) Filed: Sep. 20, 2021

(65) Prior Publication Data
US 2022/0101051 A1 Mar. 31, 2022

(30) Foreign Application Priority Data
Sep. 28, 2020 (DE) ...................... 10 2020 212 147.8

(51) Int. Cl.
G06K 9/00 (2022.01)
G06F 18/21 (2023.01)
G06F 18/214 (2023.01)
G06F 18/2413 (2023.01)
(Continued)

(52) U.S. Cl.
CPC .......... *G06F 18/214* (2023.01); *G06F 18/217* (2023.01); *G06F 18/2413* (2023.01); *G06N 3/04* (2013.01); *G06V 10/443* (2022.01)

(58) Field of Classification Search
CPC .. G06F 18/214; G06F 18/217; G06F 18/2413; G06V 10/443; G06N 3/04
See application file for complete search history.

(56) References Cited

FOREIGN PATENT DOCUMENTS

DE    102018210937 A1    1/2020

OTHER PUBLICATIONS

Jia, Xibin, et al. "Domain-invariant representation learning using an unsupervised domain adversarial adaptation deep neural network." Neurocomputing 355 (2019): 209-220. (Year: 2019).*

(Continued)

*Primary Examiner* — Avinash Yentrapati
(74) *Attorney, Agent, or Firm* — NORTON ROSE FULBRIGHT US LLP; Gerard A. Messina (57) ABSTRACT

A method for training a neural network. The method includes providing learning input images and associated learning output data; providing auxiliary input images; generating modifications of these auxiliary input images by introducing at least one predefined change into them; supplying the modifications to the neural network; ascertaining predictions for the predefined change, using output data onto which the neural network maps the modifications; assessing deviations of the predictions from the predefined change, using an auxiliary cost function; optimizing parameters of the neural network to improve the assessment by the auxiliary cost function during further processing of auxiliary input images; supplying the learning input images to the neural network; assessing deviations of the output data, thus obtained, from the learning output data, using a main cost function; optimizing parameters of the neural network to improve the assessment by the main cost function during further processing of learning input images.

15 Claims, 4 Drawing Sheets (51) Int. Cl.
  *G06N 3/04*    (2023.01)
  *G06V 10/44*   (2022.01)

(56) References Cited

OTHER PUBLICATIONS

Wulfmeier, Markus et al. "Incremental Adversarial Domain Adaptation for Continually Changing Environments" 2018 IEEE International Conference on Robotics and Automation (ICRA). May 2018. 7 Pages.
Liu, Yen-Cheng et al. "Detach and Adapt: Learning Cross-Domain Disentangled Deep Representation" Proceedings of the IEEE Conference on Computer Vision and Pattern Recognition (CVPR), 2018, arXiv:1705.01314. 10 Pages.
Chen, Cheng et al. "Synergistic Image and Feature Adaptation: Towards Cross-Modality Domain Adaptation for Medical Image Segmentation" The Thirty-Third AAAI Conference on Artificial Intelligence (AAI-19), 2019, 8 Pages.
Jia, Xibin et al. "Domain-invariant representation learning using an unsupervised domain adversarial adaptation deep neural network" Neurocomputing, May 2019, 12 Pages.

\* cited by examiner

DATA-BASED UPDATING OF THE TRAINING OF CLASSIFIER NETWORKS

FIELD

The present invention relates to the training of classifier networks via which image data, for example, may be processed.

BACKGROUND INFORMATION

Neural networks are widely used for classifying images. For example, image classifiers are used in driving assistance systems or systems for at least semi-automated driving in order to classify images of traffic situations with respect to which objects are shown in these images.

These types of networks are generally trained using learning input images and associated learning outputs, onto which the network is ideally to map the learning input images. Learning input images are continuously processed by the network to form outputs, and parameters of the network are optimized until these outputs correspond sufficiently well to the particular learning outputs. Due to its power for generalization, the network may also accurately classify input images which thus far have gone unseen.

This requires that the input images supplied during subsequent active operation still belong to the same distribution (also referred to as "domain") to which the learning input images used for the training also belong. If input images from a much different domain are to be used, a new training is necessary. A method is described in German Patent Application No. DE 10 2018 210 937 A1 via which radar data may be transferred from one domain into another domain in order to save costs for recording new training data and manually "labeling" them with learning outputs.

SUMMARY

Within the scope of the present invention, a method for training a neural network is provided. This neural network maps input images onto an association with one or multiple classes of a predefined classification, onto a semantic segmentation, and/or onto a recognition of one or multiple objects, as output data.

The input images may encompass camera images, video images, radar images, LIDAR images, or ultrasound images, for example.

Learning input images as well as associated learning output data onto which the neural network ideally is to map the learning input images are provided in the method according to an example embodiment of the present invention. These learning input images are also referred to as "labeled" images, since the learning output data are available as labels.

In addition, in accordance with an example embodiment of the present invention, auxiliary input images are provided. These auxiliary input images differ from the learning input images in that no further knowledge about the auxiliary input images is required. In particular, these may thus be "unlabeled" images for which no learning output data, and thus also no labels, are available. It is even advantageous when the auxiliary input images do not belong to the learning input images, since "overfitting" to the learning input images is thus avoided.

In accordance with an example embodiment of the present invention, modifications of these auxiliary input images are generated by introducing at least one predefined change into the auxiliary input images. These modifications are supplied to the neural network in a first, "self-supervised" learning process. Predictions for the predefined change are ascertained using outputs onto which the neural network maps the modifications in each case.

Deviations of the predictions from the predefined change are assessed using a predefined auxiliary cost function. Parameters that characterize the behavior of the neural network are optimized with the objective of improving the assessment by the auxiliary cost function during further processing of auxiliary input images. A stochastic gradient descent method (GDM) or an ADAM algorithm, for example, may be used for this optimization.

This learning process is referred to as "self-supervised" since, due to introducing the predefined change into the auxiliary input images, something known, by which the prediction of the neural network is measured, is generated.

The learning input images are supplied to the neural network in a second, "supervised" learning process. Deviations of the output data, thus obtained, from the learning outputs are assessed using a main cost function. Parameters that characterize the behavior of the neural network are optimized with the objective of improving the assessment by the main cost function during further processing of learning input images.

This learning process is referred to as "supervised" due to the fact that the known information by which the output of the neural network is measured is supplied from the outside as prior knowledge.

The self-supervised learning process and the supervised learning process do not necessarily have to be carried out in succession.

Rather, these learning processes may, for example, also intermesh in such a way that, for example, learning input images and auxiliary input images are supplied to the neural network in alternation. It is only important that the supplying of an auxiliary input image acts in each case only on the optimization with regard to the auxiliary cost function, while the supplying of a learning input image acts in each case only on the optimization with regard to the main cost function.

In addition, the self-supervised learning process may still be continued even if the supervised learning process has long since been completed. Thus, for example, a neural network that is already completely trained with regard to its primary task, namely, the classification, the semantic segmentation, or the object recognition, may be subsequently adapted by supplying further auxiliary input images and further self-supervised learning.

The self-supervised learning process may in particular be utilized, for example, to train the neural network to process images from a domain that differs to a certain extent from the domain of the learning input images, by supplying suitable auxiliary input images. Simply stated, a piece of information concerning the domain to which this auxiliary input image belongs is present in each new auxiliary input image. The neural network learns, in a self-supervised manner, to bypass images from this domain.

In this way, the neural network may in particular be made robust against, for example, changes in the physical recording process which, after completion of the supervised learning process, supplies the input images to be processed in the actual application.

When the neural network is to be trained, for example, for the processing of input images that have been recorded using a sensor that is borne by a vehicle, providing the necessary learning input images is very time-consuming and costly. Many kilometers of test runs must be completed in order to record learning input images having variability that is adequate for the training. In addition, labels must be provided for these learning input images, which often requires manual effort. The labeled learning input images ultimately obtained are then more or less strongly bound to the configuration and geometric arrangement of the sensors used for the image recording.

If a sensor is now replaced with another sensor or is mounted at some other position at the vehicle after completion of the test runs, the mapping situation is different from that in which the training images for the supervised learning have been recorded. The input images that are processed during subsequent active operation of the neural network thus belong to a new domain that is slightly shifted with respect to the domain of the learning input images. Via self-supervised learning based on auxiliary input images from this new domain, the neural network may learn to adapt to the shift with respect to the original domain of the learning input images.

The training in accordance with an example embodiment of the present invention, which assesses the success of the self-supervised learning and of the supervised learning based on cost functions that are different from one another, optimally prepares the neural network for this subsequent adaptation during active operation. On the one hand, for the subsequent adaptation, the self-supervised learning may utilize the same cost function as for the original training. On the other hand, due to the additional efficiency control based on the main cost function, the neural network is urged to make this adaptation without sacrificing the accuracy of the class association, semantic segmentation, or object recognition ascertained by the neural network. Thus, unlike the training using a combined cost function in which the main cost function and the auxiliary cost function are summed, for example, the neural network may take the "path of least resistance" and completely avoid learning the domain adaptation, for example via particularly good performance with regard to the main cost function.

The situation is somewhat comparable to the legally required general inspection of vehicles. If a major deficiency at one location, such as loss of oil, adversely affects traffic safety, this deficiency cannot be compensated for by exceeding the requirements at another location, for example replacing all four tires. Thus, the vehicle owner cannot substitute the major repair that is due for a repair which, from its standpoint, promises more "traffic safety per euro."

A domain shift of the type described may also occur without active intervention by the user. For example, wear or soiling of the sensor used for the image recording may result in the subsequent input images being systematically changed compared to the original learning input images. In addition, for example permanent changes in the surroundings in which the images are recorded may likewise result in a domain shift. Thus, for example, due to governmental mask mandates and the increased awareness of the population about infection protection, the faces of many pedestrians are provided with everyday masks, and in this regard pedestrians look different than in learning input images of traffic situations that were recorded prior to the coronavirus pandemic. This trend will continue if the supply shortage of FFP masks having a better protective effect, and which in turn look much different from the everyday masks, is overcome.

The prediction of the predefined change which the neural network ascertains from the modifications of the auxiliary input images may, for example, be of the same data type as the result actually targeted via the processing of input images, using the neural network. The prediction may then be ascertained in the neural network in exactly the same way as the class association, semantic segmentation, and/or object recognition actually targeted.

However, the prediction of the predefined change may also be of a completely different data type. Thus, for example, the neural network may be provided per se for mapping an input image onto a vector using Softmax scores, which indicate that the input image belongs to one or multiple classes. At the same time, for example the prediction may include a rotational angle about which the modification of the auxiliary input image has been rotated relative to the auxiliary input image. In this case as well, the training with regard to the auxiliary cost function and the training with regard to the main cost function may profit from one another.

For this purpose, one particularly advantageous embodiment of the present invention encompasses a neural network that includes a feature extractor and at least two head units, each of which obtains a result, delivered by the feature extractor, as input.

At least one first head unit is designed to map the result obtained from the feature extractor onto an association with one or multiple classes of a predefined classification, onto a semantic segmentation, and/or onto a recognition of one or multiple objects, as output data. In contrast, at least one second head unit is designed to map the result obtained from the feature extractor onto output data that indicate a prediction for the predefined change.

For example, the feature extractor may include multiple convolution layers, each of which applies one or multiple filter cores to the input supplied to it. The head units may include, for example, one or multiple fully networked layers.

The filter cores are advantageously reweighted relative to one another during the optimization with regard to the auxiliary cost function, but as such remain unchanged. The underlying consideration is that all input images processed by the neural network are ultimately made up of the same basic features, and also typical changes that are introduced during the generation of modifications do not completely re-create such basic features. When the filter cores as such remain unchanged, the likelihood that the optimization with regard to the auxiliary cost function does not impair the accuracy of the class association, of the semantic segmentation, and/or of the object recognition is increased at the outset, even without considering the main cost function.

In general, it is advantageous when more parameters which characterize the behavior of the feature extractor are changeable during the optimization with regard to the main cost function than during the optimization with regard to the auxiliary cost function. For example, if the optimization with regard to the auxiliary cost function is continued for the purpose of adapting to a domain shift of the input images during subsequent active operation, by suitably limiting the parameters of the feature extractor thus changed, it may be ensured that the performance of the neural network with regard to the main cost function is not impaired. This is important in particular for the domain adaptation during active operation, since the neural network at this point in time is no longer trained based on labeled learning input images. Thus, there would no longer be a corrective measure for a possible impairment of the class association, the semantic segmentation, or the object recognition.

For the self-supervised learning, in addition to the parameters of the feature extractor, in particular the parameters of the second head unit may also be changed. For the supervised learning, in addition to the parameters of the feature extractor, in particular the parameters of the first head unit may also be changed.

The predefined change to which the modification of the auxiliary input image is subject is advantageously selected in such a way that the neural network maps the modification onto the same class association, semantic segmentation, or object recognition as the original auxiliary input image. When the neural network is presented with such a modification, this only provides the incentive to improve the parameters of the neural network with regard to the auxiliary cost function, without this conflicting with the previous training result with regard to the main cost function.

For example, the predefined change may encompass a rotation of the auxiliary input image and/or a mutual exchange of the image contents of tiles into which the auxiliary input image is subdivided. The modification in particular then still contains the same objects as the original auxiliary input image.

In a further advantageous embodiment, the parameters that are optimized with regard to the auxiliary cost function during the optimization include at least one metaparameter that characterizes at least one aspect of the learning behavior of the neural network. These metaparameters may include, for example, a learning rate, an increment (referred to as "momentum") for the optimization of parameters of the neural network, or a weighting factor ("weight decay") via which the parameters of the neural network are themselves entered into the auxiliary cost function and/or into the main cost function. One or multiple of these metaparameters may then also be used, for example, for the optimization with regard to the main cost function. For example, a gradient-based metalearning algorithm such as MAML or REPTILE may be used for training metaparameters.

These types of metaparameters are to be regarded as somewhat analogous to engine settings that make the combustion of fuel in the engine more efficient. The labeled learning input images and the computing time for processing the learning input images in the neural network form the analog to fuel. The training success with regard to the main cost function forms the analog to the propulsion achieved using the engine.

A further synergy effect of the two trainings with regard to the auxiliary cost function on the one hand and with regard to the main cost function on the other hand is that the optimization with regard to the auxiliary cost function, in a comparably short time period, may deliver good starting values for the parameters of the neural network, from which the optimization with regard to the main cost function may start. Thus, this training does not have to start from random starting values for the parameters, in which the output data delivered by the neural network are still largely unrelated to the learning output data that are part of the learning input images.

In a further advantageous embodiment of the present invention, the learning input images include synthetically generated images. In contrast, the auxiliary input images include images that are recorded using at least one sensor. Synthetically generated images may be generated, for example, using a generator of a generative adversarial network (GAN). For the training with regard to the main cost function, they have the advantage that not only are they available in large numbers and with great variability, but also their label is already known in advance when they are generated. Images recorded using sensors may then be utilized in the self-supervised learning in order to teach the neural network the domain shift from the domain of the synthetically generated images to the domain of the images recorded using sensors. Ultimately, the neural network thus learns to map images that are recorded using sensors onto a semantic segmentation and/or onto a recognition of one or multiple objects, but fewer or even no manually labeled learning input images are then required. At the same time, artifacts in the training, which could be brought about by using synthetically generated learning input images, are suppressed.

In a further advantageous embodiment of the present invention, one or multiple auxiliary input images are selected that are affected by at least one disturbance from which the learning input images are free. In this way, the neural network may be trained, without relabeled learning input images, how to handle these disturbances.

For example, if a camera that delivers the input images is impaired by rain, ice, or dirt in the beam path to the observed setting, and a device for eliminating the cause of this disturbance (such as a heater or a windshield wiper blade) is not available, the neural network may alternatively learn to adjust to this disturbance. The same applies, for example, if the lens of the camera or a protective screen situated in front of this lens has been damaged by falling rocks during travel, and all further recorded images are now superimposed with the damage pattern that is introduced into the glass by falling rocks. At least as a provisional solution until repair, the neural network may learn to "live with" the damage while still delivering reliable class associations, semantic segmentations, or object recognitions.

As explained above, the above-described training prepares the neural network, during active operation after completion of the initial training using labeled learning input images based on unlabeled input images, in particular to adapt to a domain shift of these input images in comparison to the original learning input images.

Therefore, the present invention further relates to a method for operating a neural network that maps input images onto an association with one or multiple classes of a predefined classification, onto a semantic segmentation, and/or onto a recognition of one or multiple objects, as output data.

Within the scope of this method, the neural network is initially trained using the method described above. Input images that have been recorded using at least one sensor are subsequently provided.

By introducing at least one predefined change into the input images, modifications of these input images are generated. These modifications are supplied to the neural network. Analogously to the method described above, predictions for the predefined change are ascertained, using output data onto which the neural network maps the modifications in each case, and deviations of the predictions from the predefined change actually introduced are assessed using the predefined auxiliary cost function.

Parameters that characterize the behavior of the neural network are optimized with the objective of improving the assessment by the auxiliary cost function during further processing of modifications of input images. The previous training is thus updated with regard to the auxiliary cost function, based on the newly supplied input images. If the domain of the input images shifts with respect to the domain of the original learning input images, the neural network thus adapts to this shift.

The input images are advantageously supplied to the neural network and mapped by the neural network onto the association with one or multiple classes of a predefined classification, onto the semantic segmentation, and/or onto the recognition of one or multiple objects. In this way, the adaptation to the stated domain shift that is learned based on the modifications of the input image may be worthwhile, so that the class association, the semantic segmentation, and/or the recognition become(s) more accurate.

This is in turn particularly advantageous in a further embodiment, in which a control signal is formed from the class association, from the semantic segmentation, or from the object recognition, and a vehicle is controlled via the control signal. The likelihood that the vehicle then carries out an action in response to an input image including a traffic situation, which is appropriate for this traffic situation, is then advantageously increased.

The present invention may be embodied in software, for example. Therefore, the present invention further relates to a computer program that includes machine-readable instructions which, when executed on one or multiple computers, prompt the computer(s) to carry out one of the described methods. In this sense, control units for vehicles and embedded systems for technical devices which are likewise capable of executing machine-readable instructions are to be regarded as computers.

Moreover, the present invention further relates to a machine-readable data medium and/or a download product that includes the computer program. A download product is a digital product that is transmittable via a data network, i.e., downloadable by a user of the data network, and that may be offered for sale in an online store, for example, for immediate download.

In addition, a computer may be equipped with the computer program, the machine-readable data medium, or the download product.

Further measures that enhance the present invention are described in greater detail below with reference to the figures, together with the description of the preferred exemplary embodiments of the present invention.

DETAILED DESCRIPTION OF EXAMPLE EMBODIMENTS

Figure 1:
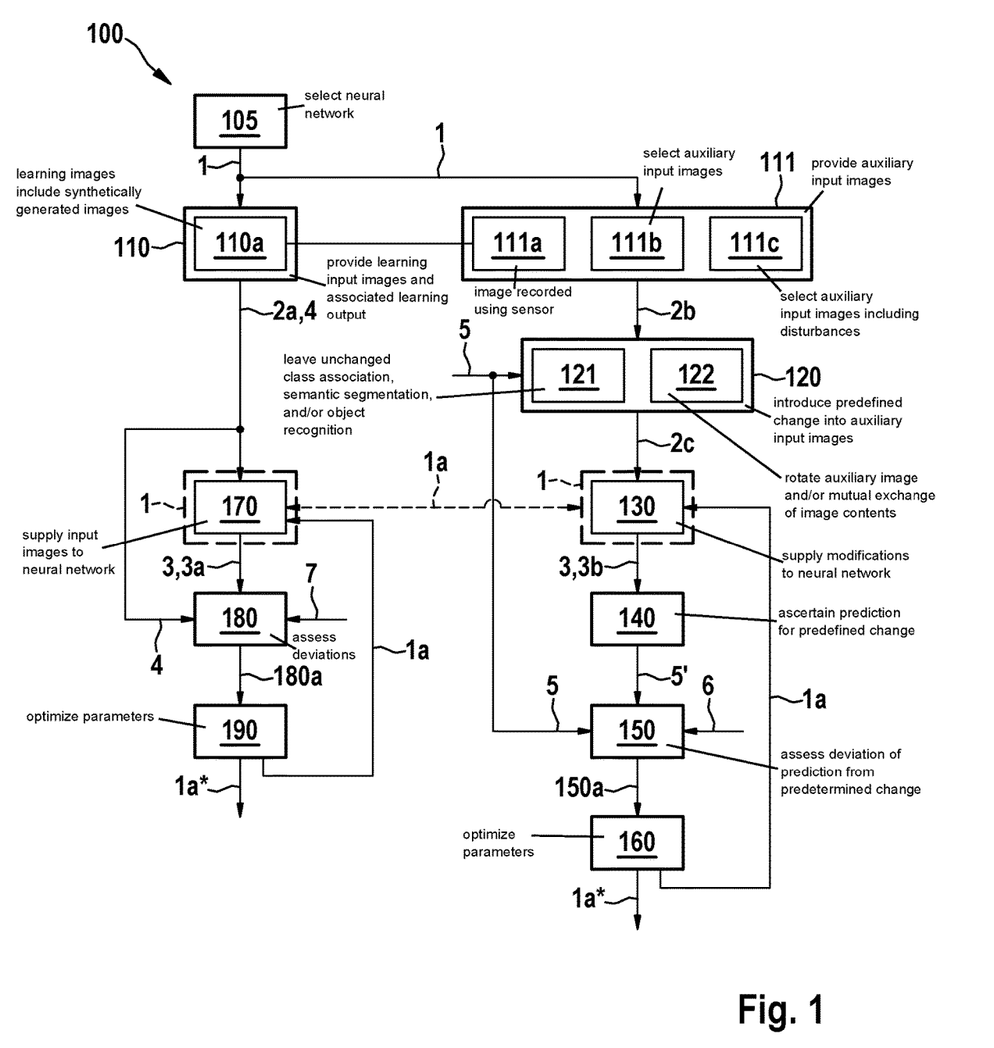
FIG. 1 shows one exemplary embodiment of method 100 for training a neural network 1, in accordance with the present invention.

FIG. 1 is a schematic flowchart of one exemplary embodiment of method 100 for training a neural network 1. In particular, a neural network 1 (illustrated in greater detail in FIG. 2) including a feature extractor 11 and two head units 12 and 13 may be selected in step 105.

Learning input images 2a as well as associated learning output data 4 onto which neural network 1 is ideally to map learning input images 2a are provided in step 110. According to block 110a, learning input images 2a may in particular include synthetically generated images, for example.

Auxiliary input images 2b are provided in step 111. If learning input images 2a include synthetically generated images (block 110a), in particular auxiliary input images 2b may include images that are recorded using at least one sensor 8. This is indicated by the linkage between blocks 110a and 111a.

In general, auxiliary input images 2b that do not belong to learning input images 2a may be selected according to block 111b. In particular, for example auxiliary input images 111c including disturbances from which learning input images 2a are free may be selected according to block 111c.

At least one predefined change 5 is introduced into auxiliary input images 2b in step 120, resulting in a modification 2c. According to block 121, change 5 may in particular leave unchanged, for example, the class association, the semantic segmentation, and/or the object recognition onto which neural network 1 maps auxiliary input image 2b. According to block 122, change 5 may in particular include, for example, a rotation of auxiliary input image 2b and/or a mutual exchange of the image contents of tiles into which auxiliary input image 2b is subdivided.

Modifications 2c are supplied to neural network 1 in step 130. This results in output data 3, 3b, from which a prediction 5' for predefined change 5 is ascertained in step 140. A deviation of this prediction 5' from predefined change 5 is assessed in step 150, using a predefined auxiliary cost function 6. Parameters 1a that characterize the behavior of neural network 1 are optimized in step 160 with the objective of improving assessment 150a by auxiliary cost function 6 during further processing of auxiliary input images 2b. This is a self-supervised learning process.

Learning input images 2a are supplied to neural network 1 in step 170 and mapped onto output data 3, 3a, which indicate an association with one or multiple classes of a predefined classification, a semantic segmentation, and/or a recognition of one or multiple objects. Deviations of these output data 3, 3a from learning output data 4 are assessed in step 180, using a main cost function 7. Parameters 1a that characterize the behavior of neural network 1 are optimized in step 190 with the objective of improving assessment 180a by main cost function 7 during further processing of learning input images 2a. This is a supervised learning process.

As illustrated by the dashed-line linkage between steps 130 and 170, the self-supervised learning process and the supervised learning process operate "hand in hand" in such a way that changes in parameters 1a that are developed in the one learning process also benefit the respective other learning process, at least in part. The trained state of parameters 1a that is ultimately obtained by the combination of the two learning processes is denoted by reference number 1a*.

Figure 2:
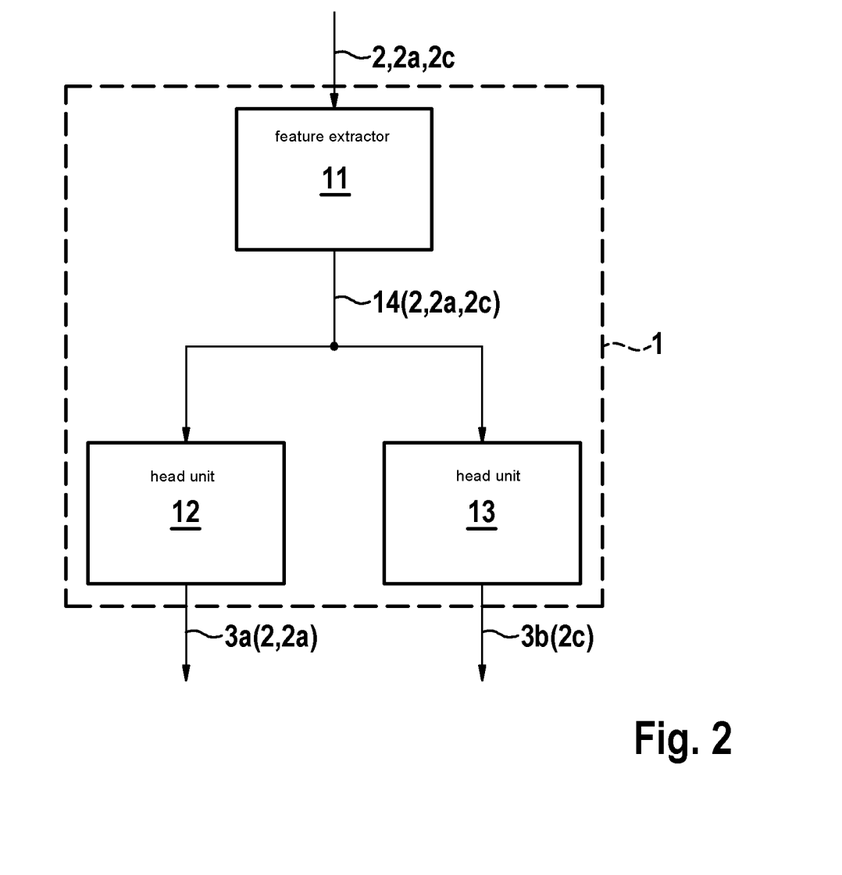
FIG. 2 shows an example of neural network 1 including a feature extractor 11 and two head units 12 and 13.

FIG. 2 schematically shows an architecture of an example of a neural network 1 that may be trained using method 100 described above. Neural network 1 includes a feature extractor 11, which may include multiple convolution layers, for example, and which delivers a result 14 in each case for input images, learning input images, and modifications 2c of auxiliary input images 2b. Result 14 is supplied to a first head unit 12 and to a second head unit 13.

For the case that result 14 has been generated from an input image 2 or a learning input image 2a, first head unit 12 is in particular designed to deliver an association with one or multiple classes of a predefined classification, a semantic segmentation, and/or a recognition of one or multiple objects, as output data 3, 3a.

For the case that result 14 has been generated from a modification 2c of an auxiliary input image 2b, second head unit 13 is in particular designed to deliver output data 3b that indicate a prediction 5' for predefined change 5 that is used in forming modification 2c.

Figure 3:
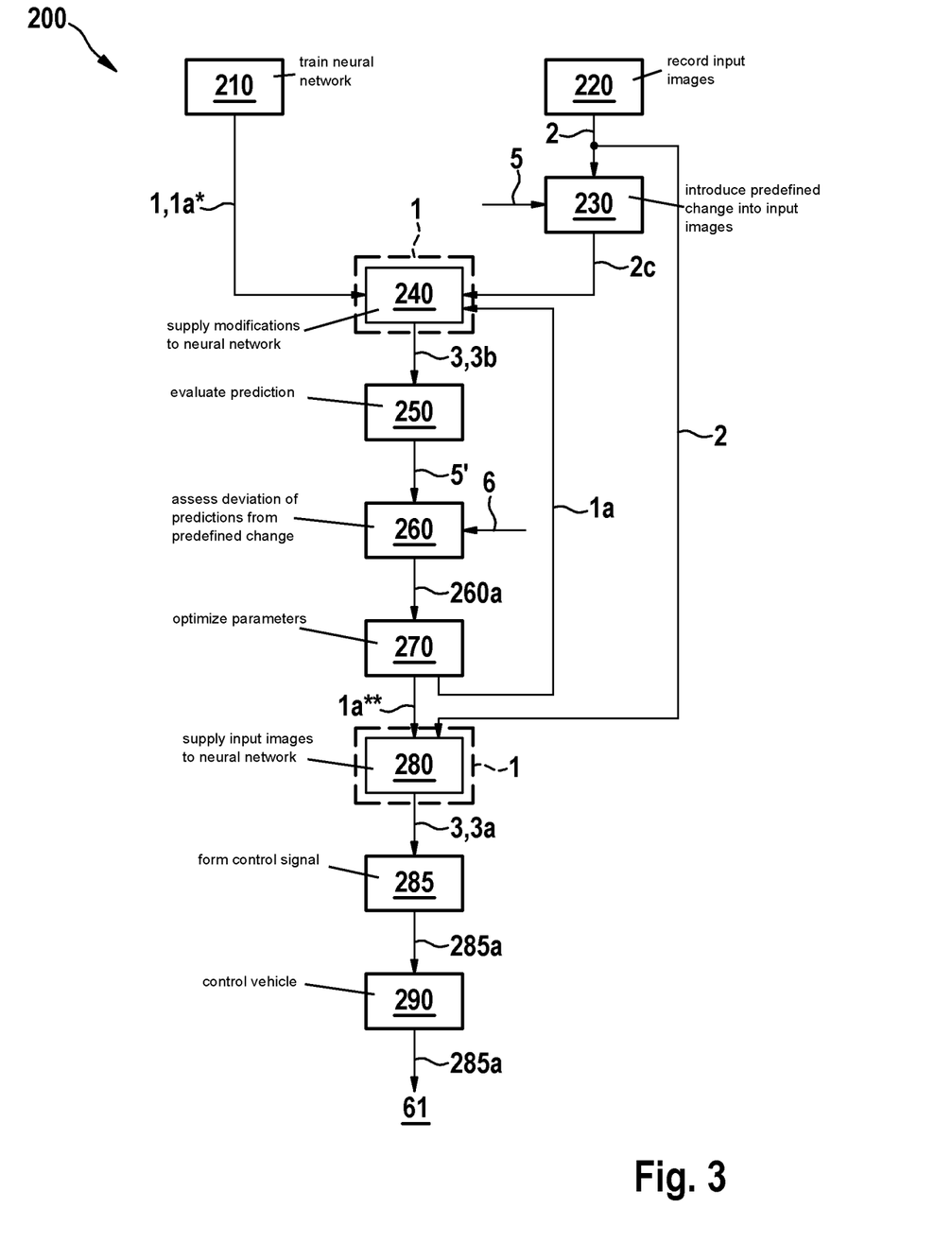
FIG. 3 shows one exemplary embodiment of method 200 for operating a neural network 1, in accordance with the present invention.

FIG. 3 is a schematic flowchart of one exemplary embodiment of method 200 for operating a neural network 1. Neural network 1 is trained using above-described method 100 in step 210, resulting in trained state 1*a\ of parameters 1*a* of this neural network 1.

Input images 2 that have been recorded using at least one sensor 8 are provided in step 220. A predefined change 5 is introduced into these input images 2 in step 230, resulting in modifications 2*c*.

These modifications 2*c* are supplied to neural network 1 in step 240 and mapped by neural network 1 onto output data 3, 3*b*, which indicate a prediction 5' for predefined change 5. This prediction 5' is evaluated from output data 3*b* in step 250.

Deviations of predictions 5' from predefined change 5 are assessed in step 260, using predefined auxiliary cost function 6. Parameters 1*a* that characterize the behavior of neural network 1 are optimized in step 270 with the objective of improving assessment 260*a* by auxiliary cost function 6 during further processing of modifications 2*c* of input images 2.

Neural network 1, which has previously been trained by the combination of self-supervised learning and supervised learning, is thus further trained based on input images 2. As explained above, the neural network thus learns to detect a possible domain shift with respect to the domain of learning input images 2*a*. The further trained state of parameters 1*a* is denoted by reference number 1*a**\*\**.

Input images 2 may be supplied to neural network 1, which has been further trained in this way, in step 280, so that a class association, a semantic segmentation, and/or an object recognition result(s) as output data 3, 3*a*. A control signal 285*a* may then be formed from these output data 3, 3*a* in step 285, via which a vehicle 61 is controlled in step 290.

Figure 4:
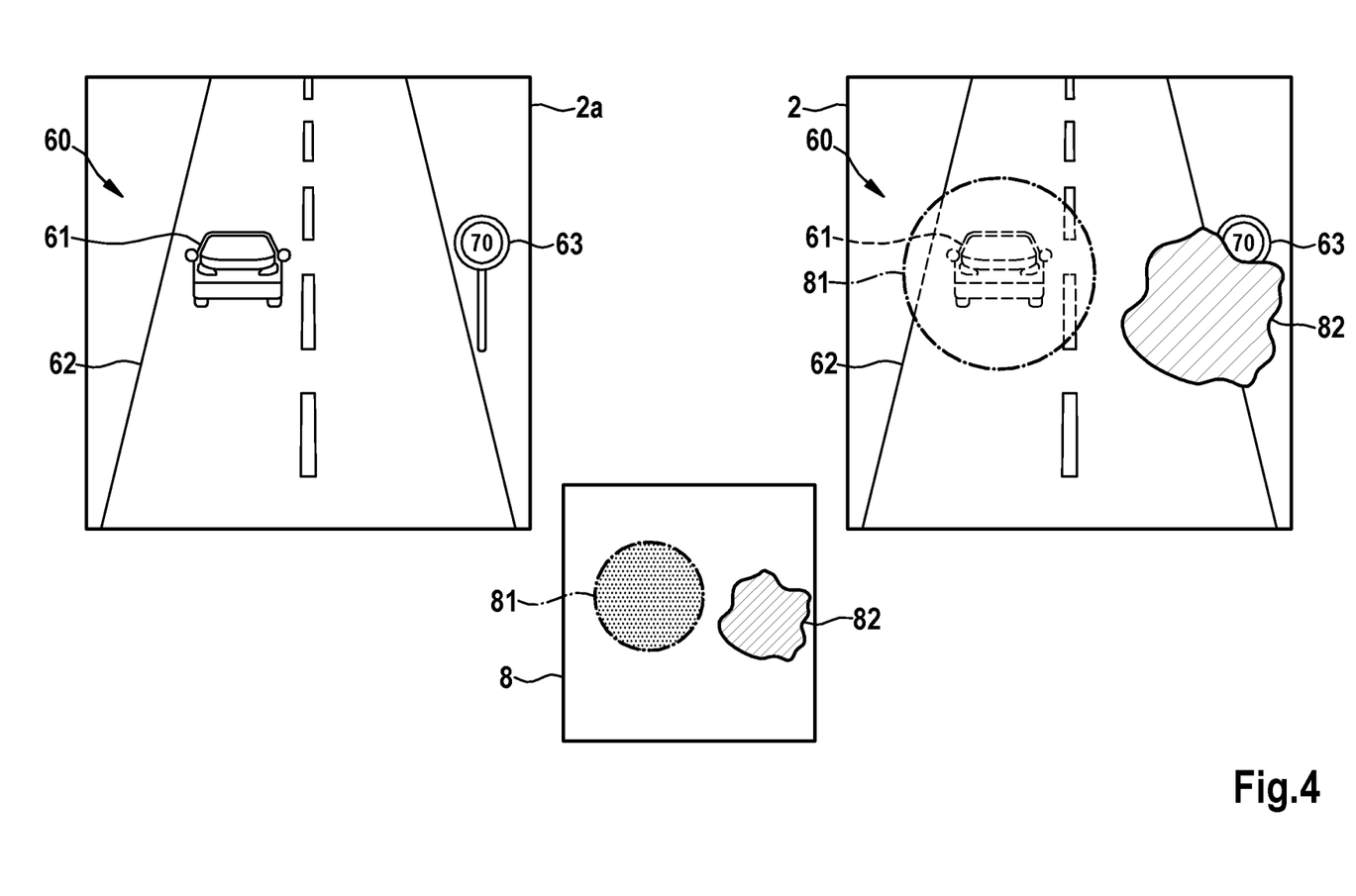
FIG. 4 shows an example of an application situation for method 200.

FIG. 4 shows an example of a situation in which method 200 may be applied. An example of a learning input image 2*a* of a traffic situation 60 is shown, which may be synthetically generated using a GAN, for example. A vehicle 61, a roadway 62, and a traffic sign 63 are clearly apparent.

A neural network 1 may be trained with this type of learning input image 2*a*. In contrast, during actual use by neural network 1 of input images 2 that are recorded by a vehicle 61, not as good an image quality is to be expected as in learning input images 2*a*. Thus, image sensor 8 that is used is susceptible, for example, to precipitation 81 and/or dirt 82 accumulating on it. As a result, in an input image 2 that is recorded using image sensor 8, for example vehicle 61 has a highly "washed-out" appearance, and traffic sign 63 is partially concealed by dirt 82. Within the scope of the self-supervised learning, neural network 1 learns its primary task: for example, to master the class association, the semantic segmentation, or the object recognition just as well on qualitatively poorer input images 2 as on learning input images 2*a*.

What is claimed is:

1. A method for training a neural network that maps input images onto an association with one or multiple classes of a predefined classification, onto a semantic segmentation, and/or onto a recognition of one or multiple objects, as output data, the method comprising the following steps:
    providing learning input images and associated learning output data onto which the neural network ideally is to map the learning input images;
    providing auxiliary input images;
    generating modifications of the auxiliary input images by introducing at least one predefined change into each auxiliary input image of the auxiliary input images;
    supplying the modifications to the neural network;
    ascertaining predictions for the predefined change, using output data onto which the neural network maps each of the modifications;
    assessing deviations of the predictions from the predefined change, using a predefined auxiliary cost function;
    optimizing parameters that characterize a behavior of the neural network, with an objective of improving the assessment by the auxiliary cost function during further processing of the auxiliary input images;
    supplying the learning input images to the neural network;
    assessing deviations of output data, onto which the neural network maps the supplied learning input images, from the learning output data, using a main cost function;
    optimizing parameters which characterize the behavior of the neural network with an objective of improving the assessment by the main cost function during further processing of the learning input images.

2. The method as recited in claim 1, wherein the neural network includes:
    a feature extractor;
    at least one first head unit configured to obtain a result, delivered by the feature extractor, as input, and that is configured to map the result onto an association with one or multiple classes of a predefined classification, onto a semantic segmentation, and/or onto a recognition of one or multiple objects, as output data; and
    at least one second head unit that that obtains the result, delivered by the feature extractor, as input, and that is configured to map the result onto output data that indicate a prediction for the predefined change.

3. The method as recited in claim 2, wherein the feature extractor includes multiple convolution layers, each of which applies one or multiple filter cores to input supplied to it, and the filter cores are reweighted relative to one another during the optimization with regard to the auxiliary cost function, but as such remain unchanged.

4. The method as recited in claim 1, wherein more parameters which characterize the behavior of the feature extractor are changeable during the optimization with regard to the main cost function than during the optimization with regard to the auxiliary cost function.

5. The method as recited in claim 1, wherein the predefined change is selected in such a way that the neural network maps the modification onto the same class association, semantic segmentation, or object recognition as the original auxiliary input image.

6. The method as recited in claim 1, wherein the predefined change encompasses a rotation of the auxiliary input image and/or a mutual exchange of image contents of tiles into which the auxiliary input image is subdivided.

7. The method as recited in claim 1, wherein the parameters that are optimized with regard to the auxiliary cost function during the optimization include at least one metaparameter that characterizes at least one aspect of a learning behavior of the neural network.

8. The method as recited in claim 1, wherein the auxiliary input images are those that do not belong to the learning input images.

9. The method as recited in claim 1, wherein the learning input images include (synthetically generated images, and the auxiliary input images include images that are recorded using at least one sensor.

10. The method as recited in claim 1, wherein one or multiple of the auxiliary input images are selected those that are affected by at least one disturbance from which the learning input images are free.

11. A method for operating a neural network that maps input images onto an association with one or multiple classes of a predefined classification, onto a semantic segmentation, and/or onto a recognition of one or multiple objects, as output data, the method comprising the following steps:

training the neural network including:
providing learning input images and associated learning output data onto which the neural network ideally is to map the learning input images,
providing auxiliary input images,
generating modifications of the auxiliary input images by introducing at least one predefined change into each auxiliary input image of the auxiliary input images,
supplying the modifications to the neural network,
ascertaining predictions for the predefined change, using output data onto which the neural network maps each of the modifications,
assessing deviations of the predictions from the predefined change, using a predefined auxiliary cost function,
optimizing parameters that characterize a behavior of the neural network, with an objective of improving the assessment by the auxiliary cost function during further processing of the auxiliary input images,
supplying the learning input images to the neural network,
assessing deviations of output data, onto which the neural network maps the supplied learning input images, from the learning output data, using a main cost function, and
optimizing parameters which characterize the behavior of the neural network with an objective of improving the assessment by the main cost function during further processing of the learning input images;
providing input images that have been recorded using at least one sensor;
generating modifications of the input images by introducing at least one predefined change into each of the input images;
supplying the modifications of the input images to the neural network;
ascertaining predictions for the predefined change using output data onto which the neural network maps each of the modifications of the input images;
assessing deviations of the predictions from the predefined change, using the predefined auxiliary cost function; and
optimizing parameters that characterize the behavior of the neural network, with the objective of improving the assessment by the auxiliary cost function during further processing of modifications of the input images.

12. The method as recited in claim 11, wherein the input images are supplied to the neural network and mapped by the neural network onto the association with one or multiple classes of a predefined classification, onto the semantic segmentation, and/or onto the recognition of one or multiple objects, as output data.

13. The method as recited in claim 12, wherein a control signal is formed from the class association, from the semantic segmentation, or from the object recognition, and a vehicle is controlled via the control signal.

14. A non-transitory machine-readable data medium on which is stored a computer program for training a neural network that maps input images onto an association with one or multiple classes of a predefined classification, onto a semantic segmentation, and/or onto a recognition of one or multiple objects, as output data, the computer program, when executed by a computer, causing the computer to perform the following steps:

providing learning input images and associated learning output data onto which the neural network ideally is to map the learning input images;
providing auxiliary input images;
generating modifications of the auxiliary input images by introducing at least one predefined change into each auxiliary input image of the auxiliary input images;
supplying the modifications to the neural network;
ascertaining predictions for the predefined change, using output data onto which the neural network maps each of the modifications;
assessing deviations of the predictions from the predefined change, using a predefined auxiliary cost function;
optimizing parameters that characterize a behavior of the neural network, with an objective of improving the assessment by the auxiliary cost function during further processing of the auxiliary input images;
supplying the learning input images to the neural network;
assessing deviations of output data, onto which the neural network maps the supplied learning input images, from the learning output data, using a main cost function;
optimizing parameters which characterize the behavior of the neural network with an objective of improving the assessment by the main cost function during further processing of the learning input images.

15. A computer configured to train a neural network that maps input images onto an association with one or multiple classes of a predefined classification, onto a semantic segmentation, and/or onto a recognition of one or multiple objects, as output data, the computer configured to:

provide learning input images and associated learning output data onto which the neural network ideally is to map the learning input images;
provide auxiliary input images;
generate modifications of the auxiliary input images by introducing at least one predefined change into each auxiliary input image of the auxiliary input images;
supply the modifications to the neural network;
ascertain predictions for the predefined change, using output data onto which the neural network maps each of the modifications;
assess deviations of the predictions from the predefined change, using a predefined auxiliary cost function;
optimize parameters that characterize a behavior of the neural network, with an objective of improving the assessment by the auxiliary cost function during further processing of the auxiliary input images;
supply the learning input images to the neural network;
assess deviations of output data, onto which the neural network maps the supplied learning input images, from the learning output data, using a main cost function;
optimize parameters which characterize the behavior of the neural network with an objective of improving the assessment by the main cost function during further processing of the learning input images.

* * * * *